United States Patent [19]

Forward et al.

[11] Patent Number: 4,795,123

[45] Date of Patent: Jan. 3, 1989

[54] WIDEBAND ELECTROMAGNETIC DAMPING OF VIBRATING STRUCTURES

[75] Inventors: Robert L. Forward, Oxnard; William S. Griffin, Manhattan Beach, both of Calif.

[73] Assignee: The United States of America as represented by the Secretary of the Air Force, Washington, D.C.

[21] Appl. No.: 49,358

[22] Filed: May 14, 1987

[51] Int. Cl.$^4$ ............................................. F16M 13/00
[52] U.S. Cl. ...................................... 248/550; 73/668; 188/378
[58] Field of Search ............... 248/550, 648, 562, 636, 248/630; 318/460, 605, 649, 651, 648; 188/378; 267/136; 73/668; 74/574

[56] References Cited

U.S. PATENT DOCUMENTS

| | | | |
|---|---|---|---|
| 2,443,471 | 6/1948 | Mason | 178/44 |
| 2,964,272 | 12/1960 | Olson | 248/19 |
| 3,464,657 | 9/1969 | Bullard | 248/20 |
| 3,703,999 | 11/1972 | Forys et al. | 248/20 |
| 4,033,541 | 7/1977 | Malueg | 248/358 R |
| 4,429,496 | 2/1984 | Masri | 52/1 |
| 4,483,425 | 11/1984 | Newman | 188/378 |
| 4,498,038 | 2/1985 | Malueg | 318/648 |
| 4,546,960 | 10/1985 | Abrams et al. | 267/136 |
| 4,615,504 | 10/1986 | Sandercock | 248/550 |
| 4,635,892 | 1/1987 | Baker | 248/550 |
| 4,643,385 | 2/1987 | Sandercock | 248/550 |

OTHER PUBLICATIONS

Technical Bulletin from Wilcoxon Research entitled, "Vibration Generators for Impedance Heads".
Article from Applied Optics, vol. 18, p. 690, dated 1 Mar. 1979, by Robert Forward entitled, "Electronic Damping of Vibrations in Optical Structures".
AIAA Article dated Jan. 1981, by Robert Forward entitled, "Electronics Damping of Orthogonal Bending Modes in a Cylindrical Mast-Experiment".

Primary Examiner—Tom Noland
Assistant Examiner—Robert P. Bell
Attorney, Agent, or Firm—Donald J. Singer; Jacob N. Erlich; William G. Auton

[57] ABSTRACT

The damping of vibrations in a mechanical structure is accomplished while minimizing the impact on the design and operation of the structure through the use of a plurality of attachable vibration damping elements. Each vibration damping element contains: an accelerometer, an integrator, mixer, power amplifier, and a force actuator. The accelerometer measures the motion of the vibration in the structure at its attachment point and produces an acceleration measurement signal. The integrator integrates the acceleration measurement signal to produce a velocity measurement signal. The mixer produces a composite motion signal by mixing the acceleration measurement signal with the velocity measurement signal. The power amplifier adjusts the phase and amplitude of the composite motion signal to drive the force actuator to damp the sensed vibration along one dimension at the attachment point of the force actuator. By placing three vibration damping element at right angles to each other at a location on the structure, three dimensional vibration damping is obtained at that point.

1 Claim, 1 Drawing Sheet

WIDEBAND ELECTROMAGNETIC DAMPING OF VIBRATING STRUCTURES

STATEMENT OF GOVERNMENT INTEREST

The invention described herein may be manufactured and used by or for the Government for governmental purposes without the payment of any royalty thereon.

BACKGROUND OF THE INVENTION

The present invention relates to structure stabilizing systems, and more particularly to a vibration damping system for removing vibrations from a structure over a fairly wide range of frequencies of vibration.

Vibration has historically been recognized as a problem which can produce a variety of adverse effects in equipment. Special precautions are needed to protect machine elements of air-borne laser tracking systems. One such system while mounted on an optical bench in a U.S. Air Force laser lab aircraft experienced beam jitter induced by vibration that was so strong, that the conical tracking loop would break lock.

The task of damping such undesirable vibration in the structure of the optical bench, while minimizing the impact on the existing design, has been alleviated, to some extent, by the following U.S. patents, which are incorporated herein by reference:

U.S. Pat. No. 2,443,471 issued to Mason on 15 June 1948;
U.S. Pat. No. 2,964,272 issued to Olson on 13 Dec. 1960;
U.S. Pat. No. 3,464,657 issued to Bullard on 2 Sept. 1969; and
U.S. Pat. No. 3,703,999 issued to Forys et al on 28 Nov. 1972.

All of the references cited above disclose systems for controlling mechanical vibration. The Mason reference discloses a damping assembly which uses a pair of piezoelectric crystal plates as a damping means. The approach of applying dynamically responsive damping elements is superior to mechanical mounting solutions such as springs, dash pots and other vibration absorbing mountings. However, the present problem also requires removing vibration over a wide range of frequencies.

The Olson and Bullard references provide a vibration controlling apparatus containing a vibration sensing element, an amplifier, and a driving element. The driving element translates the amplified electrical signal into mechanical force to compensate for vibration. The present problem requires a vibration damping system capable of responding to components of vibration produced by both acceleration as well as velocity of the host aircraft and neither of the above-cited references accomplish both velocity and acceleration nulling.

The Forys et al reference discloses a wideband stabilizing system for stabilizing cameras on moving vehicles. This stabilizing system includes a mounting system which houses the camera, as well as damps motion induced vibration. However, for the present problem, it is preferred to use the existing optical bench, rather than construct a new platform. Therefore, a vibration damping system is needed which may be attached to existing structures.

SUMMARY OF THE INVENTION

The present invention is a damping device for removing vibrations from structures with minimum impact on their design and operation. Wideband frequency damping of vibrations is accomplished on a structure using a plurality of damping elements. Each element is attached to the edge of the vibrating structure by a tapped, threaded hole or glue joint. When prime power is supplied, the package proceeds to eliminate over a wide band all vibrations that attempt to move the edge of the structure in the direction of the sensitive axis of the package. Instead of being externally driven, the shaker in this invention is driven by a feedback signal from the output of an accelerometer, which is contained in each damping element.

In the preferred embodiment of the invention, each damping element contains: an accelerometer, an integrator, a mixer, a power amplifier, and a driver. The accelerometer produces an acceleration measurement signal which indicates the acceleration along the axis of the damping element.

The integrator produces a velocity measurement signal along the axis of the damping element. The velocity measurement signal is produced by integrating the output signal of the accelerometer.

The mixer produces a composite signal by receiving and mixing the signals produced by the integrator and the accelerometer. This composite signal is amplified by the power amplifier to produce the feedback signal which is sent to the driver.

The driver is a heavy coil which vibrates linearly on two diaphragms in response to the feedback signal from the mixer. This linear vibration along the axis of the damping element serves to dampen the vibration induced by the sensed acceleration and velocity components of motion in the structure.

Each damping element serves to dampen vibration on the structure at its attachment point in one dimension only. Therefore, the vibration damping system of the present invention involves placing three damping elements, each at a right-angle from the other two, on the structure to completely dampen vibration at the contact points. This system damps the vibrations of structures in three dimensions with minimum impact on their design and operation.

It is a principal object of the present invention to dampen undesired vibrations in mechanical structures.

It is another object of the present invention to dampen vibrations in structures while minimizing the impact on their design and operation.

It is another object of the present invention to dampen vibrations over a wide range of frequencies.

It is another object of the present invention to dampen components of vibrations produced by both acceleration as well as velocity.

These and other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a vibration damping system of removing undesired vibrations from mechanical structures. The impact on the design and operation of such structures is minimized through the use of a plurality of damping elements, each of which is attached to the structure by a tapped, threaded hole, glue joint or similar means.

Figure 1:
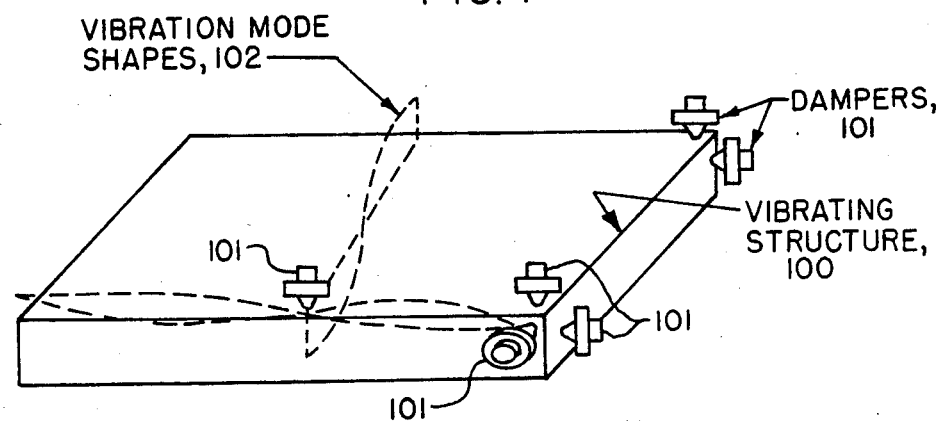
FIG. 1 is a schematic view of the vibration damping system of the present invention.

FIG. 1 is a schematic view of the system of the present invention, which depicts a plurality of damping elements 101, attached to a structure 100.

The vibrating structure 100 can be any instrument that is being stabilized by the present invention, such as the air-borne laser tracking system mentioned above. This vibrating structure 100 is normally mounted on an optical bench on board U.S. Air Force laser lab aircraft using any conventional means, such as clamps and brackets. These conventional mounting systems can also include the passive vibrating absorbing mountings discussed above (such as spring and dash pot clamp systems) but these systems alone have been ineffective in eliminating vibration. Each damping element damps vibration in one dimension along an axis formed by the element and its contact point with the structure. Damping of vibrations in three dimensions at a certain point is accomplished by attaching three damping elements, with each placed at a right-angle with the other two, around that point.

Figure 2:
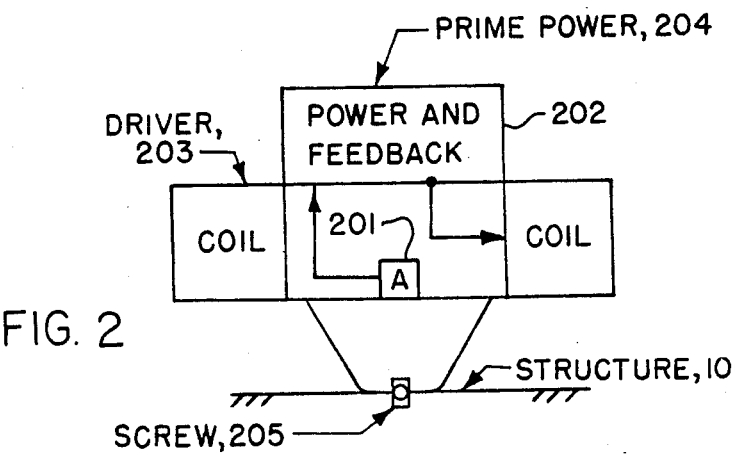
FIG. 2 is a mechanical schematic of a single damping element of the present invention.

FIG. 2 is a mechanical schematic view depicting a single damping element in the preferred embodiment of the present invention. Each damping element contains an accelerometer 201, a power and feedback circuit 202, and a force actuator or driver 203.

The accelerometer 201 and driver 203 exist in a commercially available device manufactured by Wilcoxon Research, Bethesda, MD 20014 which consists of a Z602W impedance head surrounded by an electromagnetic shaker-driver. This commercially available device is modified by the power and feedback circuit so that it is used, not to measure the vibrations of structures but to damp them.

The impedance head is attached to the structure 100 in a small ¼ inch tapped hole and a ¼ inch screw 205. The accelerometer produces an acceleration measurement signal which indicates the acceleration along the axis of the impedance head. In the present invention, this acceleration measurement signal is used by the Power and feedback circuit 202 to produce a feedback signal which indicates the measure of vibration induced in the structure.

In response to the feedback signal, the outer body of the driver 203 then produces damping by moving back and forth nearly linearly along the axis of the impedance head. The inertial weight of the moving driver coil drives the rear of the impedance head. The force in the impedance head is transformed through the tapered section and then into the structure. The amplified velocity component of the feedback signal, when fed back into the electromagnetic driver, produces velocity damping of the vibration modes acting at the attachment point. The acceleration component of the feedback signal is feedback to null the acceleration. This has the effect of "pinning" the attachment point to inertial space.

Figure 3:
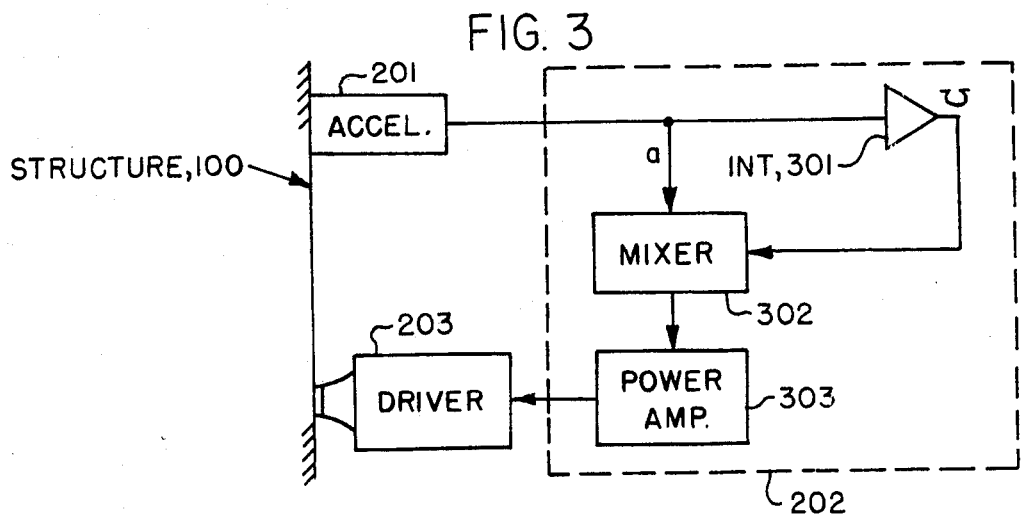
FIG. 3 is an electrical schematic of the feedback circuit of the damping element of FIG. 2.

FIG. 3 is an electrical schematic of the feedback portion of the power and feedback circuit 202 of FIG. 2.

The power distribution portion of the circuit is conventional in the art, and little need be said except that the preferred embodiment operates using either 120 volts AC or 28 volts DC. These voltage sources serve only as a Power supply for the present invention.

As mentioned in the discussion on FIG. 2, the accelerometer 201 produces an acceleration measurement signal which indicates the acceleration along the axis of the impedance head. This signal is integrated by the integrator 301 to produce a velocity measurement signal.

Both the acceleration measurement signal from the accelerometer, and the velocity measurement signal from the integrator are combined by the mixer to produce a composite signal, which defines the motion of the sensed vibration in terms of both velocity and acceleration measurements. The mixer 302 is a conventional electronic device which generates an output signal which is proportional to the sum of the two input signals that it receives. Such devices are both commercially-available, and defined in standard texts such as "The Modern Dictionary of Electronics" by R. R. Graf, published by the H. W. Sams & Co., Inc. 1984. As mentioned above, the mixer produces a composite signal by receiving and mixing the signals produced by the integrator and the accelerometer. The composite signal is amplified by the power amplifier 303 to produce the feedback signal to the driver. When the driver or force actuator produces a force that is in response to the composite signal, the net effect is that the vibration is damped at the contact point of the impedance head with the structure.

The preferred embodiment of the present invention uses the model F3 wrap-around driver with the Z602W impedance head produced by Wilcoxon Research at P.O. Box 5798, Bethesda, MD 20014. The present invention is entitled "Wideband Electromagnetic Damping of Vibrating Structures" since the preferred embodiment both senses and damps a wideband of frequencies of vibration. According to the manufacturer's specification, the combination of the driver and impedance head denoted above sense vibration in a range of 20 to 15,000 Hz; and produce a nominal force output at 30 to 2,500 Hz.

The Wilcoxon system described above, has a natural resonance of 30 Hz, so the feedback electronics would have to have a low frequency roll off to avoid oscillation and overload problems. However, the present invention is not confined to this particular configuration of vibration generators, but is a vibration damping system which may employ a variety of alternate vibration generators. For example, FIG. 3 depicts the accelerator 201 as being physically separated from the driver 203, with both being attached to the structure 100 in proximity to each other.

A summary of the history of electronic damping as well as the theory behind the present invention is discussed in an article entitled "Electronic Damping of Vibrations in Optical Structures" by R. Forward in Applied Optics, Vol. 18 page 690 dated 1979. This article discusses various methods to achieve electronic control over vibrational noise in mechanical systems. In the present invention, both the acceleration and velocity components of vibration are sensed by a sensor and converted into an electronic signal to produce feedback signal which is used by the driver to counter the sensed vibration. Since the reaction time of the electronic elements of the present invention is in microseconds, the driver is actually countering the same vibrational signal that is sensed by the sensor.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. A vibration damping system which damps motion-induced vibration in a mechanical structure using a plurality of vibration damping elements, each of which forms an axis by being fixed to said mechanical structure at a contact point, each of said vibration damping elements producing a mechanical force to dampen vibration along said axis at said point of contact, said plurality of vibration damping elements thereby collectively damping said motion-induced vibration in said mechanical structure, each of said vibration damping elements comprising:

an accelerometer which is housed in said vibration damping element and which produces an acceleration measurement signal by measuring acceleration along said axis of its vibration damping element;

an integrator which produces a velocity measurement signal by integrating said acceleration measurement signal received from said accelerometer;

a mixer which produces a combined motion signal by mixing said velocity measurement signal received from said integrator with said acceleration measurement signal received from said accelerometer;

a power amplifier which produces a composite motion signal by amplifying and adjusting the phase of said combined motion signal received from said mixer;

a means for attaching said vibration damping element to said mechanical structure; and a force actuator which contains said accelerometer and is attached to said structure by said attaching means at one end, and which is electrically attached to said power amplifier at its other end, said force actuator receiving and translating said composite motion signal into mechanical force to dampen vibration.

* * * * *